(12) United States Patent
Miyata

(10) Patent No.: US 7,489,360 B2
(45) Date of Patent: Feb. 10, 2009

(54) IMAGE CAPTURE DEVICE HAVING MULTIPLE OPERATION MODES AND RECORDING MEDIUM RECORDED WITH MODE SWITCHING PROGRAM

(75) Inventor: Akira Miyata, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 768 days.

(21) Appl. No.: 11/032,270

(22) Filed: Jan. 10, 2005

(65) Prior Publication Data

US 2005/0157178 A1  Jul. 21, 2005

(30) Foreign Application Priority Data

Jan. 16, 2004  (JP)  ............... 2004-008825

(51) Int. Cl.
  *H04N 5/225*  (2006.01)
(52) U.S. Cl. ................... 348/372; 348/333.01
(58) Field of Classification Search ............. 348/14.02, 348/207.1, 207.99, 333.01, 372–375; 455/565; 362/23, 109
See application file for complete search history.

(56) References Cited

U.S. PATENT DOCUMENTS

| 7,164,935 | B2* | 1/2007 | Naka et al. ................. 455/565 |
| 7,259,781 | B2* | 8/2007 | Koreki et al. ........... 348/207.99 |
| 2001/0015760 | A1* | 8/2001 | Fellegara et al. ....... 348/333.01 |
| 2001/0026446 | A1* | 10/2001 | Yoshida ..................... 362/109 |
| 2004/0022047 | A1* | 2/2004 | Okayasu ..................... 362/23 |
| 2004/0051807 | A1* | 3/2004 | Niwa .......................... 348/372 |
| 2004/0109063 | A1* | 6/2004 | Kusaka et al. ............ 348/207.1 |
| 2004/0223049 | A1* | 11/2004 | Taniguchi et al. ........ 348/14.02 |

FOREIGN PATENT DOCUMENTS

JP  2000-092372 A  3/2000
JP  2000-307919 A  11/2000

OTHER PUBLICATIONS

"Pentax Optio 550 Digital Camera Operating Manual," Pentax Corporation, 2003.*
"DCRP Review: Nikon Coolpix SQ," Digital Camera Resource Page, Sep. 9, 2003.*
"The Nikon Guide to Digital Photography with the Coolpix SQ," Nikon Corporation, 2003.*

* cited by examiner

*Primary Examiner*—Lin Ye
*Assistant Examiner*—Dennis Hogue
(74) *Attorney, Agent, or Firm*—Frishauf, Holtz, Goodman & Chick, P.C.

(57) ABSTRACT

In an image capture device, if the power is off when the capture mode key is depressed the power is turned on and the device enters the capture mode, if the device is in the playback mode when the capture mode key is depressed the mode is switched to the capture mode, if the device is in the capture mode when the capture mode key is depressed the power is turned off, if the power is off when the playback mode key is depressed, the device enters the playback mode and the power is turned on, if the device is in the playback mode when the playback mode key is depressed, the power is turned off, and if the device is in the capture mode when the playback mode key is depressed, the mode is switched to the playback mode.

7 Claims, 7 Drawing Sheets

| BUTTON \ STATE PRIOR TO BUTTON OPERATION | OFF | PLAYBACK MODE | CAPTURE MODE |
|---|---|---|---|
| CAPTURE MODE BUTTON | CAPTURE MODE | CAPTURE MODE | OFF |
| PLAYBACK MODE BUTTON | PLAYBACK MODE | OFF | PLAYBACK MODE |

FIG.1A
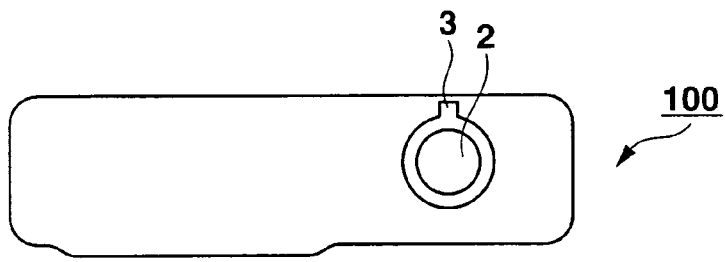
FIG.1B
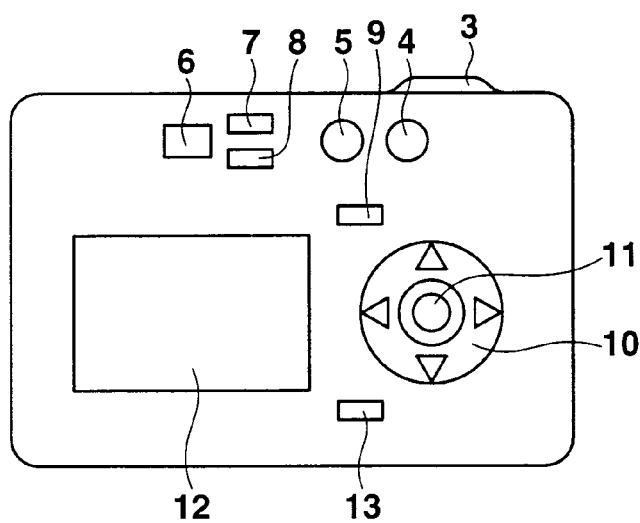
FIG.2
| BUTTON \ STATE PRIOR TO BUTTON OPERATION | OFF | PLAYBACK MODE | CAPTURE MODE |
|---|---|---|---|
| CAPTURE MODE BUTTON | CAPTURE MODE | CAPTURE MODE | OFF |
| PLAYBACK MODE BUTTON | PLAYBACK MODE | OFF | PLAYBACK MODE |

FIG.5A
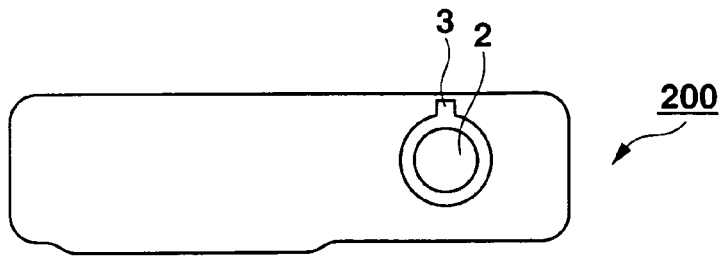
FIG.5B
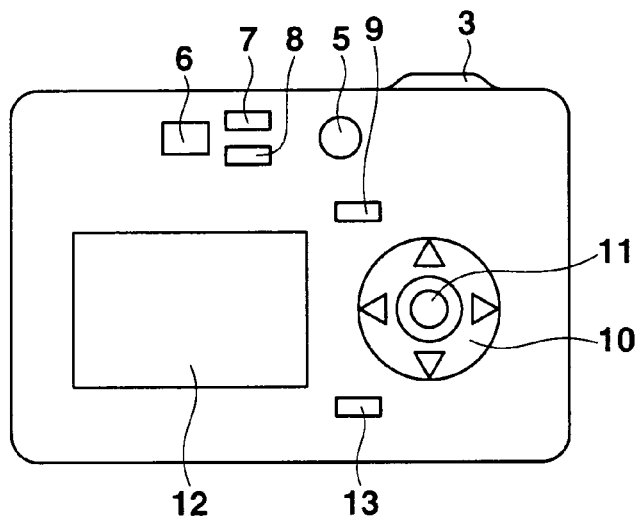
FIG.6
| STATE PRIOR TO BUTTON OPERATION / BUTTON | OFF | PLAYBACK MODE | CAPTURE MODE |
|---|---|---|---|
| SHUTTER BUTTON | CAPTURE MODE | CAPTURE MODE | SHOOTING |
| PLAYBACK MODE BUTTON | PLAYBACK MODE | OFF | PLAYBACK MODE |
| PLAYBACK MODE BUTTON | PLAYBACK MODE | PLAYBACK MODE | POWER OFF WITH LONG DEPRESSION |

FIG.8A
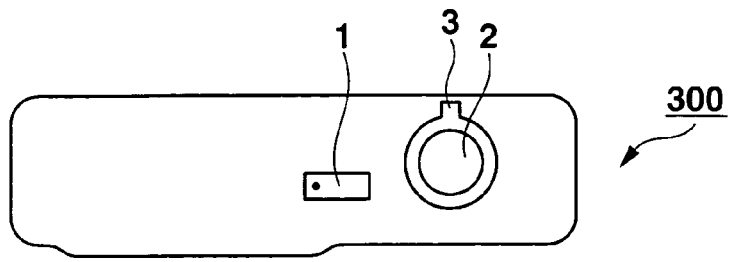
FIG.8B
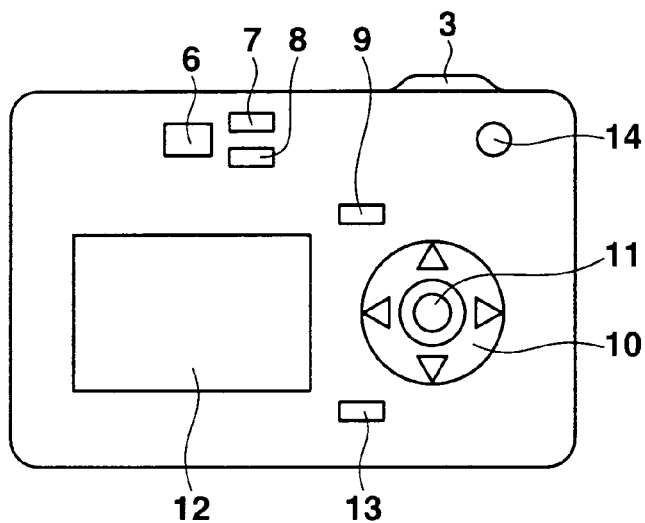
FIG.9
| BUTTON \ STATE PRIOR TO BUTTON OPERATION | OFF | PLAYBACK MODE | CAPTURE MODE |
|---|---|---|---|
| POWER BUTTON | CAPTURE MODE | OFF | OFF |
| MODE SWITCHING BUTTON | CAPTURE MODE | CAPTURE MODE | PLAYBACK MODE |

IMAGE CAPTURE DEVICE HAVING MULTIPLE OPERATION MODES AND RECORDING MEDIUM RECORDED WITH MODE SWITCHING PROGRAM

CROSS-REFERENCE TO RELATED APPLICATIONS

This application is based upon and claims the benefit of priority from prior Japanese Patent Applications No. 2004-008825, filed Jan. 16, 2004, the entire contents of which are incorporated herein by reference.

BACKGROUND OF THE INVENTION

1. Field of the Invention

The present invention relates to an image capture device which is set to the capture or playback enable state with a single button operation and a mode switching program.

2. Description of the Related Art

Conventionally, to capture (record) an image of an object to be captured such as a scene or to play back the captured image with an electronic or digital camera, it is required to operate a power switch (button) and a mode changeover switch (for example, a slide switch) which are mounted on the camera. That is, in the conventional digital camera, turning on the power to the camera and switching between capture (REC) and playback (PLAY) modes should be performed separately.

Another type of electronic camera has been proposed which has a mode changeover switch which doubles as the power switch. This switch has a first stop position at which the capture mode is set, a second stop position at which the playback mode is set, and a third stop position between the first and second positions at which the power is turned off. That is, turning the power on or off and switching between the capture and the playback mode is allowed by operating the single mode changeover switch. This type of camera is disclosed in, for example, Japanese Unexamined Patent Publication 2000-307919.

With the former-type electronic camera having the power switch and the mode changeover switch, however, if the camera is in the playback mode when the power switch is turned on, the mode changeover switch must be operated to set the capture mode in order to capture an object image to be captured. This is time-consuming, resulting in failure to carry out shooting immediately. If, on the other hand, the camera is in the capture mode when the power is turned on, the mode changeover switch must likewise be operated to set the playback mode to review an image already captured. This is also time-consuming.

With the latter-type camera described in the above Patent Publication, when switching from the playback mode to the capture mode or vice versa, the mode changeover switch will pass through the third or center stop position at which the power is turned off. That is, the power becomes turned on in the capture or playback mode after it is turned off once. In case of urgent shooting or review, therefore, a time is taken to set the camera to the shooting enable state or the review enable state.

It is therefore an object of the present invention to provide an image capture device and a mode switching method in which the shooting enable state or the review enable state is set with a single button operation.

BRIEF SUMMARY OF THE INVENTION

According to one aspect of the present invention, there is provided an image capture device comprising:

a capture mode key and a playback mode key which are operated by a user;

a detecting unit configured to detect operation states of the capture mode key and the playback mode key;

a first switching operation control unit configured to, if a power to the image capture device is in an off state when the operation of either of the mode keys is detected, turn on the power to the image capture device in a mode corresponding to an operated key of either of the mode keys;

a second switching operation control unit configured to, if, when the operation of either of the mode keys is detected, the mode of the image capture device differs from the mode corresponding to the operated key, switch the mode of the image capture device to the mode corresponding to the operated key; and a third switching operation control unit configured to, if, when the operation of either of the mode keys is detected, the mode of the image capture device is identical to the mode corresponding to the operated key, turn off the power to the image capture device.

According to another aspect of the present invention, there is provided an image capture device comprising:

a shutter key and a playback mode key which are operated by a user;

a detecting unit configured to detect an operated state of the playback mode key;

a first switching operation control unit configured to, when the shutter key is operated, turn on power to the image capture device in a capture mode; and a second switching operation control unit configured to, when an operation of the playback mode key is detected by the detecting unit, if a mode of the image capture device differs from a playback mode, switch a mode of the image capture device to the playback mode and, if the mode of the image capture device is the playback mode, turn off the power to the image capture device.

According to further aspect of the present invention, there is provided an image capture device which has a capture mode to capture an image of a subject to create image data and record the image data into a memory as a data file and a playback mode to play back the image data recorded in the memory, comprising:

a power key and a mode switching key which are operated by a user;

a detecting unit configured to detect operated states of the power key and the mode switching key;

a first switching operation control unit configured to, if power to the image capture device is turned off when a key operation is detected by the detecting unit, set the image capture device to the capture mode and turn on the power; and a second switching operation control unit configured to, if the power to the image capture device is turned on when the operation of the mode switching key is detected by the detecting unit, switch the mode of the image capture device to the mode different from the processing mode prior to the operation of the mode switching key.

According to still another aspect of the present invention, there is provided an image capture device comprising:

a capture mode key and a playback mode key which are operated by a user;

a detecting unit configured to detect operations of the capture mode key and the playback key;

a first switching operation control unit configured to, when the operation of the capture mode key is detected by the detecting unit, turn power to the image capture device on in a capture mode if the image capture device is in a power-off state, switch the mode of the image capture device to the capture mode if the image capture device is in the playback mode, and turn off the power if the image capture device is in the capture mode; and a second switching operation control unit configured to, when the operation of the playback mode key is detected by the detecting unit, turn on the power to the image capture device in the capture mode if the image capture device is in the power-off state, switch the mode of the image capture device to the playback mode if the image capture device is in the capture mode, and turn off the power if the image capture device is in the playback mode.

According to still further aspect of the present invention, there is provided an image capture device comprising:

a shutter key and a playback mode key which are operated by a user;

a first switching operation control unit configured to, when the shutter key is operated, detect the state of power and a processing mode of the image capture device prior to a key operation, turn on the power to the image capture device in a capture mode if the image capture device is in a power-off state at a time of the key operation, switch the mode of the image capture device to the capture mode if the image capture device is in the playback mode at the time of the key operation, and give a command to capture an image if the image capture device is in the capture mode at the time of the key operation; and a second switching operation control unit configured to, when the playback mode key is operated, detect the state of the power and the processing mode of the image capture device at the time of the key operation, turn on the power to the image capture device in the playback mode if the image capture device is in the power-off state at the time of the key operation, switch the mode of the image capture device to the playback mode if the image capture device is in the capture mode at the time of the key operation, turn off the power if the image capture device is in the playback mode at the time of the key operation, and turn the power to the image capture device off if the image capture device is in the capture mode at the time of the key operation and the key is kept in a given state for more than a predetermined period of time.

According to further aspect of the present invention, there is provided an image capture device comprising:

a power key and a mode switching key which are operated by a user;

a first switching operation control unit configured to, when the power key is operated, detect a state of power and a processing mode of the image capture device prior to a key operation, turn on the power to the image capture device in the capture mode if the image capture device is in a power-off state at a time of the key operation, turn off the power to the image capture device if the image capture device is in the playback mode at the time of the key operation, and turn off the power to the image capture device if the image capture device is in the capture mode at the time of the key operation; and a second switching operation control unit configured to, when the mode switching key is operated, detect the state of the power and the processing mode of the image capture device at the time of the key operation, turn on the power to the image capture device in the capture mode if the image capture device is in the power-off state at the time of the key operation, switch the mode of the image capture device to the capture mode if the image capture device is in the playback mode at the time of the key operation, and switch the mode of the image capture device to the playback mode if the image capture device is in the capture mode at the time of the key operation.

According to further aspect of the present invention, there is provided a mode switching operation program comprising:

a program step of detecting the operation of the capture mode key;

a program step of detecting the state of the power and the processing mode of the image capture device when the operation of the capture mode key is detected;

a program step of turning on the power to the image capture device in the capture mode if the power is in the off state when the operation of the capture mode key is detected;

a program step of switching the processing mode of the image capture device to the capture mode if the image capture device is in the playback mode when the operation of the capture mode key is detected;

a program step of turning off the power to the image capture device if the image capture device is in the capture mode when the operation of the capture mode key is detected;

a program step of detecting the operation of the playback mode key;

a program step of detecting the state of the power and the processing mode of the image capture device when the operation of the playback mode key is detected;

a program step of turning on the power to the image capture device in the playback mode if the power is in the off state when the operation of the playback mode key is detected;

a program step of turning off the power to the image capture device if the image capture device is in the playback mode when the operation of the playback mode key is detected; and a program step of switching the processing mode of the image capture device to the playback mode if the image capture device is in the capture mode when the operation of the playback mode key is detected.

According to further aspect of the present invention, there is provided a mode switching operation program comprising:

a program step of detecting the operation of the shutter key;

a program step of detecting the state of the power and the processing mode of the image capture device when the operation of the shutter key is detected;

a program step of turning on the power to the image capture device in the capture mode if the power is in the off state when the operation of the shutter key is detected;

a program step of switching the processing mode of the image capture device to the capture mode if the image capture device is in the playback mode when the operation of the shutter key is detected;

a program step of giving a command to capture an image if the image capture device is in the playback mode when the operation of the shutter key is detected;

a program step of detecting the operation of the playback mode key;

a program step of detecting the state of the power and the processing mode of the image capture device when the operation of the playback mode key is detected;

a program step of turning on the power to the image capture device in the playback mode if the power is in the off state when the operation of the playback mode key is detected;

a program step of turning off the power to the image capture device if the image capture device is in the playback mode when the operation of the playback mode key is detected;

a program step of switching the processing mode of the image capture device to the playback mode if the image capture device is in the capture mode when the operation of the playback mode key is detected; and a program step of turning off the power to the image capture device if the playback mode key is kept in a given state after the key operation and the image capture device is in the capture mode when the operation of the playback mode key is detected.

According to further aspect of the present invention, there is provided a mode switching operation program comprising:
 a program step of detecting the operation of the power key;
 a program step of detecting the state of the power and the processing mode of the image capture device when the operation of the power key is detected;
 a program step of turning on the power to the image capture device in the capture mode if the power is in the off state when the operation of the power key is detected;
 a program step of turning off the power to the image capture device if the image capture device is in the playback mode when the operation of the power key is detected;
 a program step of turning off the power to the image capture device if the image capture device is in the capture mode when the operation of the power key is detected;
 a program step of detecting the operation of the mode switching key;
 a program step of detecting the state of the power and the processing mode of the image capture device when the operation of the mode switching key is detected;
 a program step of turning on the power to the image capture device in the capture mode if the power is in the off state when the operation of the mode switching key is detected;
 a program step of switching the processing mode of the image capture device to the capture mode if the image capture device is in the playback mode when the operation of the mode switching key is detected; and
 a program step of switching the processing mode of the image capture device to the playback mode if the image capture device is in the capture mode when the operation of the mode switching key is detected.

According to further aspect of the present invention, there is provided an image capture device comprising:
 a capture mode key and a playback mode key which are operated by a user;
 a detecting unit configured to detect the operated states of the capture mode key and the playback mode key; and
 a first switching operation control unit configured to, if power to the image capture device is in an off state when an operation of either of the mode keys is detected, turn on the power to the image capture device in a mode corresponding to an operated key.

According to further aspect of the present invention, there is provided an electronic device having a first mode in which a first operation is performed and a second mode in which a second operation is performed, comprising:
 a first-mode designation key and a second-mode designation key which are operated by a user;
 a detecting unit configured to detect operated states of the first-mode designation key and the second-mode designation key;
 a first switching operation control unit configured to, if power to the electronic device is in an off state when an operation of either of the mode designation keys is detected, turn on the power to the electronic device in a mode designated by either of the operated keys;
 a second switching operation control unit configured to, if, when the operation of either of the mode designation keys is detected, the mode of the electronic device differs from the mode corresponding to the operated key, switch the mode of the electronic device to the mode designated by the operated key; and
 a third switching operation control unit configured to, if, when the operation of either of the mode designation keys is detected, the mode of the electronic device is identical to the mode designated by the operated key, turn off the power to the electronic device.

BRIEF DESCRIPTION OF THE SEVERAL VIEWS OF THE DRAWING

FIGS. 1A and 1B are exterior views of a digital camera;
FIG. 2 shows operation patterns of the digital camera of FIGS. 1A and 1B when the mode switching buttons are operated;
FIGS. 5A and 5B are exterior views of a digital camera;
FIG. 6 shows operation patterns of the digital camera of FIGS. 5A and 5B when the mode switching buttons are operated;
FIGS. 8A and 8B are exterior views of a digital camera;
FIG. 9 shows operation patterns of the digital camera of FIGS. 8A and 8B when the mode switching buttons are operated.

DETAILED DESCRIPTION OF THE INVENTION

Figure 3:
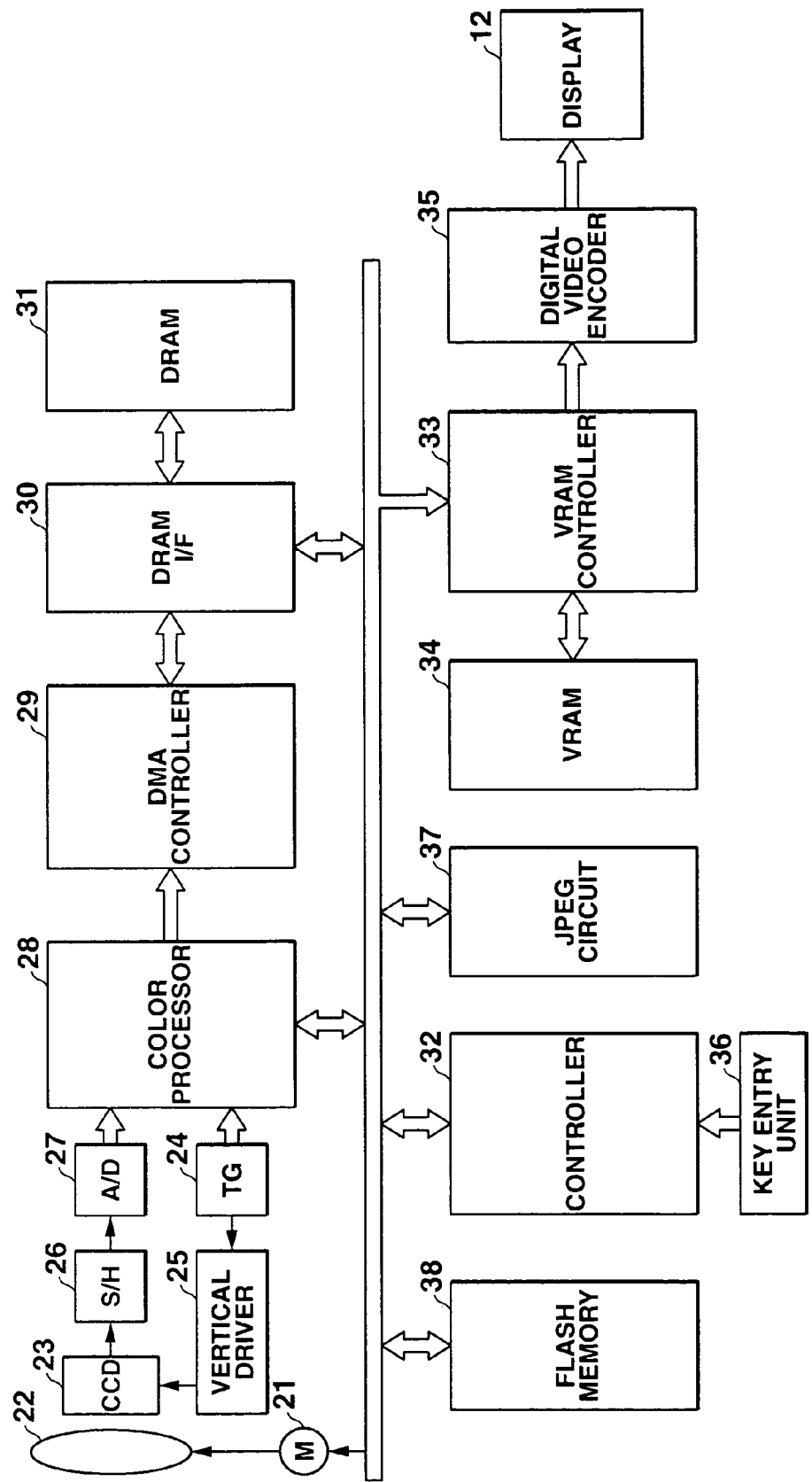
FIG. 3 is a block diagram of the electronic circuit arrangement of the digital camera of FIGS. 1A and 1B.

The embodiments of digital cameras to which the invention is adapted will be described with reference to the accompanying drawings.

EMBODIMENT 1

With this embodiment, a digital camera requires no exclusive power button. Operating a capture mode button causes the power to the camera to be turned on and capture mode to be set, thereby setting the camera to the capture enable state. Likewise, operating a playback mode button allows the power to be turned on and the playback mode to be set, thereby setting the camera to the playback enable state. However, a supplemental power switch may be provided in the digital camera in order to support the power failure of the digital camera caused by the malfunction of the capture mode button or of the playback mode button.

FIGS. 1A and 1B are exterior views of the digital camera, indicated generally at 100, of this embodiment. More specifically, FIG. 1A is a top view of the camera and FIG. 1B is a rear view of the camera. FIG. 2 shows operation patterns of the digital camera when the mode switching buttons are operated.

The digital camera 100 is provided on top with a shutter button 2 and a zoom lever 3 as shown in FIG. 1A. The shutter button 2 is used to release the shutter in the capture mode and also serves as a key to instruct setting/execution in menu selection. The zoom lever 3 is used for zooming operations.

In addition, the digital camera 100 is provided on rear with a capture mode (REC) button 4, a playback mode (PLAY) button 5, an optical finder window 6, an operation confirmation LED 7, a flash indicator LED 8, a menu key 9, a cross key or jog dial 10, a set key 11, a liquid crystal display 12, and a DISP key 13 as shown in FIG. 1B.

The capture mode button 4 is used in switching the power and modes. Depressing the capture mode button 4 when the power to the camera is in the off state sets the camera to the capture mode and, at almost the same time, to the power-on state as shown in FIG. 2. Depressing the capture mode button 4 when the camera is in the playback mode in the power on state, sets the camera to the capture mode. When the camera is in the capture mode, the power is turned off upon depression of the capture mode button 4.

The playback (PLAY) mode button 5 is also used in switching the power and modes. Depressing the playback mode button 5 in the power-off state causes the power to be turned on and, at almost the same time, the camera to go into the playback mode as shown in FIG. 2. If the playback mode button 5 is depressed when the power is turned on and the camera is in the playback mode, the power is turned off. Upon depression of the playback mode button 5 when the power is turned on and the camera is in the capture mode, switching is made to the playback mode.

The operation confirmation LED 7 emits light of given colors corresponding to the states of the digital camera 100; for example, red in the capture mode with the power applied to the camera and blue in the playback mode with the power turned on. The LED is turned off when the power is turned off. The display 12, comprised of a backlit color liquid crystal panel, is used as an electronic finder in the capture mode and, in the playback mode, to review images already captured and recorded.

Although not shown, the digital camera 100 is provided on front with a taking lens, a self-timer lamp, an optical finder window, an electronic flash unit, etc.

Although, in the above description, each of the capture mode button 4 and the playback mode button 5 is provided as an independent button, they may be replaced with a two-position slide switch with no power-off position, namely, a slide switch having a capture mode setting position and a playback mode setting position.

FIG. 3 illustrates, in block diagram form, an electronic circuit arrangement of the digital camera shown in FIGS. 1A and 1B. In the monitoring state in the capture mode, a motor (M) 21 is driven to move the aperture position of the taking lens. Then, a CCD 23, which is placed on an optical axis of an optical system 22 including the taking lens, undergoes scanning by a timing generator (TG) 24 and a vertical driver 25 to form an opto-electric conversion output signal corresponding to an object image and to output periodically an image signal for one frame.

The opto-electric conversion output signal, which is in analog form, undergoes gain adjustment for each of the primary color components of R, G and B, then is sampled and held in a sample and hold circuit (S/H) 26 and converted into digital form in an A/D converter 27. The resulting digital signal is applied to a color processor circuit 28 where color processing including interpolation and gamma correction is performed to produce a brightness signal Y and color difference signals Cb and Cr each of digital form. These signals are output to a DMA (Direct Memory Access) controller 29.

The DMA controller 29 performs DMA transfer in which the brightness signal Y and the color difference signals Cb and Cr from the color processor circuit 28 are transferred once through a DMA interface (I/F) 30 to a DRAM 31 used as a buffer memory using a composite sync signal, a memory write enable signal, and a clock signal from the color processor 28.

A controller 32 is composed of a CPU, a ROM stored with operation programs executed by the CPU and including a mode switching operation program to be described later, and a RAM used as a work memory and controls the overall operation of the digital camera 100. The controller 32 further comprises a subsidiary CPU for watching a predetermined key operation during the power of the camera is turned off.

The function of this subsidiary CPU will be described later in detail. After the DMA transfer of the brightness signal and the color difference signals to the DRAM 31, the controller 32 reads them from the DRAM 31 via the DMA interface 30 and then writes them through a VRAM controller 33 into a VRAM 34.

A digital video encoder 35 reads the brightness signal and color difference signals at regular intervals from the VRAM 34 through the VRAM controller 33, then produces a video signal from these signals and outputs it to the display unit 12.

The display unit 12, which is used as a monitor display unit (electronic finder) in the capture mode as described above, makes a display based on the video signal from the digital video encoder 35, thereby displaying images based on image data being taken in from the VRAM controller 33 in real time.

When, in the state where images are displayed in real time on the display unit 12, the shutter button 2 included in a key entry unit 36 is operated at the time when the user wants to capture a still image of the image now displayed on the display unit 12, a trigger signal is produced.

In response to this trigger signal, the controller 32 immediately disables the path from the CCD 23 to the DRAM 31 and changes to the image recording state upon termination of DMA transfer of brightness and color difference signals for one frame of picture being taken in from the CCD 23 at that time to the DRAM 31.

In this recording state, the controller 32 reads the brightness and color difference signals corresponding to one frame written in the DRAM through the DRAM interface 30 for each of the Y, Cb and Cr components in units referred to as basic blocks of 8×8 pixels. The read signals are written into a JPEG (Joint Photograph coding Experts Group) circuit 37 which provides data compression using processes of ADCT (Adaptive Discrete Cosine Transform), Huffman coding (entropy coding) and so on.

The resulting coded data are read from the JPEG circuit 37 as a data file for one picture and then written into a flash memory 38 (nonvolatile memory) packaged into a memory card which is removably loaded into the digital camera 100 as a recording medium. The flash memory 38 may be built in the digital camera 100 separately from the memory card.

Upon termination of compression of brightness and color difference signals for one frame and writing of the compressed data into the flash memory 38, the controller 32 enables the path from the CCD 23 to the DRAM 31 again.

The key entry unit 36 is composed of the shutter button 2, the zoom lever 3, the capture mode button 4, the playback mode button 5, the menu key 9, the jog dial 10, the set key 11, and the DISP key 13, which have been described in conjunction with FIGS. 1A and 1B. The signals associated with key operations are directly sent to the controller 32 and/or the subsidiary CPU.

As shown in FIG. 2, when the capture mode button 4 is depressed in the power-off state, the controller 32 sets the operation mode to the capture mode and turns on the power to the camera. When the capture mode button 4 is depressed in the state where the power is turned on and the camera is placed in the playback mode, the processing mode is switched to the capture mode. Depressing the capture mode button 4 when the camera is in the capture mode turns off the power.

If the playback mode button 5 is depressed in the power-off state, then the controller 32 switches the processing mode to the playback mode and turns on the power. If the playback mode button 5 is depressed in the state where the camera is in the playback mode, then the power is turned off. If the playback mode button 5 is depressed in the state where the camera is in the capture mode, then the processing mode is switched to the playback mode.

In the playback mode, the controller 32 selectively reads image data recorded in the flash memory 38 and decompresses the compressed data through the procedure which is the exact reverse of the data compression procedure used in the image capture mode. The decompressed image data is expanded and stored into the VRAM 34 via the VRAM controller 33. The image data is read out of the VRAM 34 at regular intervals and a video signal is produced from the image data and displayed (played back) on the display unit 12.

[Switching Operation]

Figure 4:
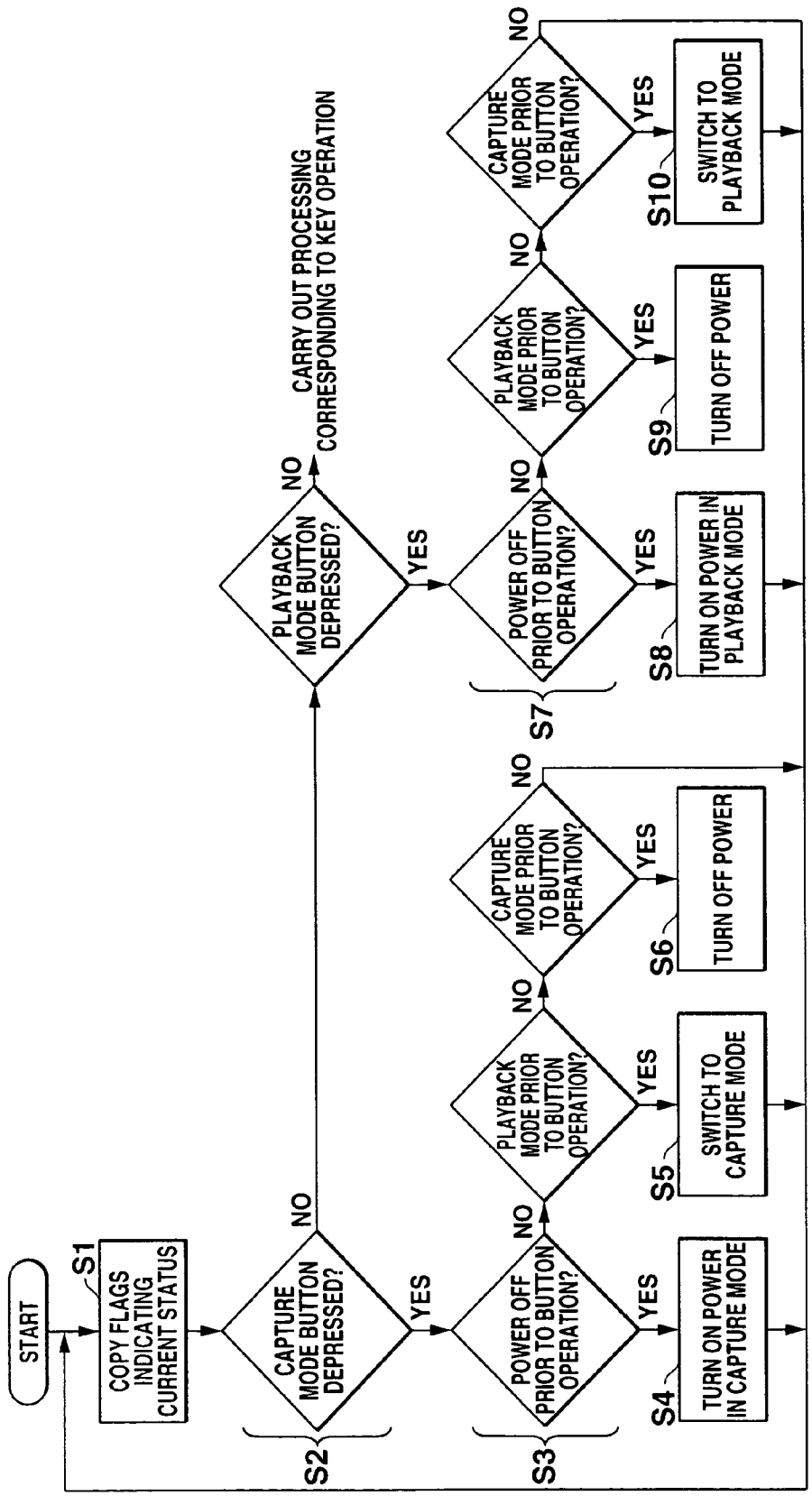
FIG. 4 is a flowchart illustrating an operation of the digital camera of FIGS. 1A and 1B.

FIG. 4 is a flowchart illustrating an exemplary operation of the digital camera of FIGS. 1A and 1B, which corresponds to the control procedure of the CPU in the controller 32 based upon a capture/playback mode switching program. This control procedure will be described below by reference to FIGS. 1A, 1B, 2 and 3. Note that the digital camera 100 is provided with an auxiliary power which is supplied to allow the control operation of the subsidiary CPU provided in the controller 32 even when the main power supplied to the circuit shown in FIG. 3 including the CPU other than the subsidiary CPU is turned off, and the operation program executed on operation of the mode switching buttons and so on resides in the RAM. The digital camera 100 is designed to be capable of executing the operation of the flowchart shown in FIG. 4 even in a state in which the main power is turned off. Namely, the power to the subsidiary CPU included in the controller 32 is kept to be supplied and watches operations of prescribed buttons including the capture mode button 4 and the playback mode button 5 even in a case where the main power is turned off. When an operation of one of the prescribed buttons in the key entry unit 36 is detected by the subsidiary CPU, a detection output is outputted from the subsidiary CPU to start the main CPU other than the subsidiary CPU provided in the controller 32 to execute the operations shown in the flowchart of FIG. 4.

The main CPU copies the values of state flags indicating the current states of the processing modes and the power into predetermined areas of the RAM (step S1).

To capture or review an image, the user first depresses the capture mode button 4 or the playback mode button 5 to set the digital camera 100 to the capture enable state or the playback enable state. The CPU examines a signal sent from the key entry unit 36. When the capture mode button 4 is depressed, the procedure goes to step S3. When the playback mode button 5 is depressed, the procedure goes to step S7. When another button is depressed, processing corresponding to the depressed button is carried out (step S2).

When the capture mode button 4 is depressed, the CPU examines the state of the digital camera 100 prior to the button depression. If the state prior to the button operation is the power-off state, then the procedure goes to step S4. In the case of the playback mode, the procedure goes to step S5. In the case of the capture mode, the procedure goes to step S6. The state of the digital camera 100 after the capture mode button 4 is depressed differs from the state before it is depressed. The CPU can know the state of the digital camera 100 prior to the button operation by examining its state flags copied in the RAM (step S3).

When the state prior to the button operation is the power-off state, switching is made to the capture mode and the power is turned on to thereby set the digital camera to the capture enable state (step S4). The procedure then returns to step S1 to wait for the next key operation by the user (for example, the depression of the shutter button 2 to issue a shooting command). When the state prior to the button operation is the playback mode, the processing mode is switched to the capture mode to thereby set the digital camera to the capture enable state (step S5). The procedure then returns to step S1 to wait for the next key operation by the user. When the state prior to the button depression is the capture mode, the power is turned off (step S6).

When the playback mode button 5 is depressed, the CPU examines the state of the digital camera 100 prior to the button depression (step S7). If the state prior to the button operation is the power-off state, then the procedure goes to step S8. In the case of the playback mode, the procedure goes to step S9. In the case of the capture mode, the procedure goes to step S10.

When the state prior to the button operation is the power-off state, switching is made to the playback mode and the power is turned on (step S8), thereby setting the digital camera to the playback enable state. The procedure then returns to step S1 to wait for the next key operation by the user (for example, an operation of selecting an image to be reviewed). When the state prior to the button operation is the playback mode, the power is turned off (step S9). When the state prior to the button operation is the capture mode, switching is made to the playback mode (step S10), thereby setting the digital camera to the playback enable state. The procedure then returns to step S1 to wait for the next key operation by the user.

The digital camera thus configured allows switching to be made immediately from the power-off state or playback mode to the capture mode; therefore, unlike the prior art, the time-consuming mode-switching operation can be avoided and image shooting can be performed immediately even in a hurry. In addition, the camera also allows switching to be made immediately from the power-off state or capture mode to the playback mode, thus requiring little time in mode switching unlike the prior art. Furthermore, even if there is no power switch (button), merely operating the capture mode button 4 or the playback mode button 5 allows the main power to be turned on and the camera to be set to the capture or playback enable state; thus, the number of buttons can be reduced by one.

Although step S4 is configured such that, when the state prior to the button operation is the power-off state, switching is made to the capture mode and the power is turned on to thereby set the digital camera to the capture enable state, the step may be modified such that, when the state prior to the button operation is the power-off state, the power is turned on first and then switching is made to the capture mode. Namely, in any case, the power is simply turned on in the capture mode.

Although step S8 is configured such that, when the state prior to the button operation is the power-off state, switching is made to the playback mode and the power is turned on to thereby set the digital camera to the playback enable state, the step may be modified such that, when the state prior to the button operation is the power-off state, the power is first turned on and then switching is made to the playback mode. Namely, in any case, the power is simply turned on in the playback mode.

EMBODIMENT 2

The first embodiment described above is configured such that, even with no power switch, simply operating the capture or playback mode button allows the power to be turned on to set the digital camera to the capture or playback enable state. The second embodiment can further reduce the number of buttons.

That is, the digital camera of the second embodiment requires no power switch and no capture mode button. Simply operating the shutter button causes the power to be turned on at the same time the capture mode is set, thereby setting the digital camera to the capture enable state. In addition, when the playback mode button is operated, the power is turned on at the same time the playback mode is set, thereby setting the digital camera to the playback enable state.

FIGS. 5A and 5B are exterior views of a digital camera of the second embodiment. FIG. 5A is a top view of the camera and FIG. 5B is a rear view of the camera. FIG. 6 shows operation patterns of the digital camera of FIGS. 5A and 5B when the shutter button 2 or playback mode button 5 is operated.

As shown in FIG. 5A, the digital camera 200 is provided on top with a shutter button 2 and a zoom lever 3. As shown in FIG. 6, when operated in the power-off state, the shutter button 2 sets the capture mode and turns on the power. When the shutter button is operated in a state where the camera is in the playback mode, the processing mode is switched to the capture mode. When the camera is in the capture mode before the shutter button 2 is operated, the shutter button 2 functions as a key to instruct shutter release. In menu selection, on the other hand, the shutter button 2 also functions as a key to instruct setting/execution. The zoom lever 3 is used to perform a zooming operation.

In addition, the digital camera 200 is equipped on rear with a playback mode (PLAY) button 5, an optical finder window 6, an operation confirmation LED 7, a flash indicator LED 8, a menu key 9, a jog dial 10, a set key 11, a liquid crystal display 12, and a DISP key 13 as shown in FIG. 5B.

The playback mode button 5 is used in setting the playback mode or turning on/off the power. As shown in FIG. 6, when the playback mode button 5 is depressed in the power-off state, the playback mode is set and, at almost the same time, the power is turned on. When the playback mode button 5 is depressed in a state where the camera is in the playback mode, the power is turned off. When the playback mode button 5 is depressed in the capture mode, the playback mode is set. When the playback mode button 5 is depressed for a long period of time in the capture or playback mode, the power is turned off.

The arrangement and functions of the units including the operation confirmation LED 7 and DISP key 13 shown in FIG. 5B are the same as with the digital camera 100 of the first embodiment. The front side of the digital camera 200 is the same as that of the digital camera 100. The corresponding parts of the digital camera 200 to those of the digital camera 100 are denoted by the same or like reference numerals.

The electronic circuit arrangement of the digital camera 200 also remains unchanged from that of the digital camera 100 shown in FIG. 3 except the configuration of the key entry unit 36 and part of the functions of the controller 32 associated with key operations.

The key entry unit 36 in the digital camera 200 is composed, as shown in FIGS. 5A and 5B, of the shutter button 2, the zoom lever 3, the playback mode button 5, the menu key 9, the jog dial 10, the set key 11, and the DISP key 13. The signals associated with operations of these keys or buttons are directly sent to the controller 32.

When the shutter button 2 provided in the key entry unit 36 is depressed, the subsidiary CPU provided in the controller 32 detects this button operation and starts the main CPU thereby producing a trigger signal. In response to this trigger signal and when the state prior to depression of the shutter button 2 is the power-off state except for the power to the subsidiary CPU, the controller 32 sets the processing mode to the capture mode and turns on the power as shown in FIG. 6. When the state prior to depression of the shutter button 2 is the playback mode, the controller 32 switches the processing mode to the capture mode. When the state prior to depression of the shutter button 2 is the capture mode, an image is shot in response to the trigger signal. That is, brightness and color difference signals for one picture, which are being taken in from the CCD 23 at the time when the shutter button 2 is depressed, are DMA transferred to the DRAM 31 and then the path from the CCD 23 to the DRAM 31 is disabled immediately. The digital camera 200 then goes into the image recording state.

When the playback mode button 5 is depressed in the power-off state, the controller 32 switches the processing mode to the playback mode and turns on the power as shown in FIG. 6. When the playback mode button 5 is depressed in the playback mode, the controller 32 turns off the power in response to depression of the playback mode button 5. When the playback mode button 5 is depressed in the capture mode, the controller 32 switches the processing mode to the playback mode. When the playback mode button 5 is depressed for a long period of time in the capture or playback mode, the power is turned off.

[Switching Operation]

Figure 7:
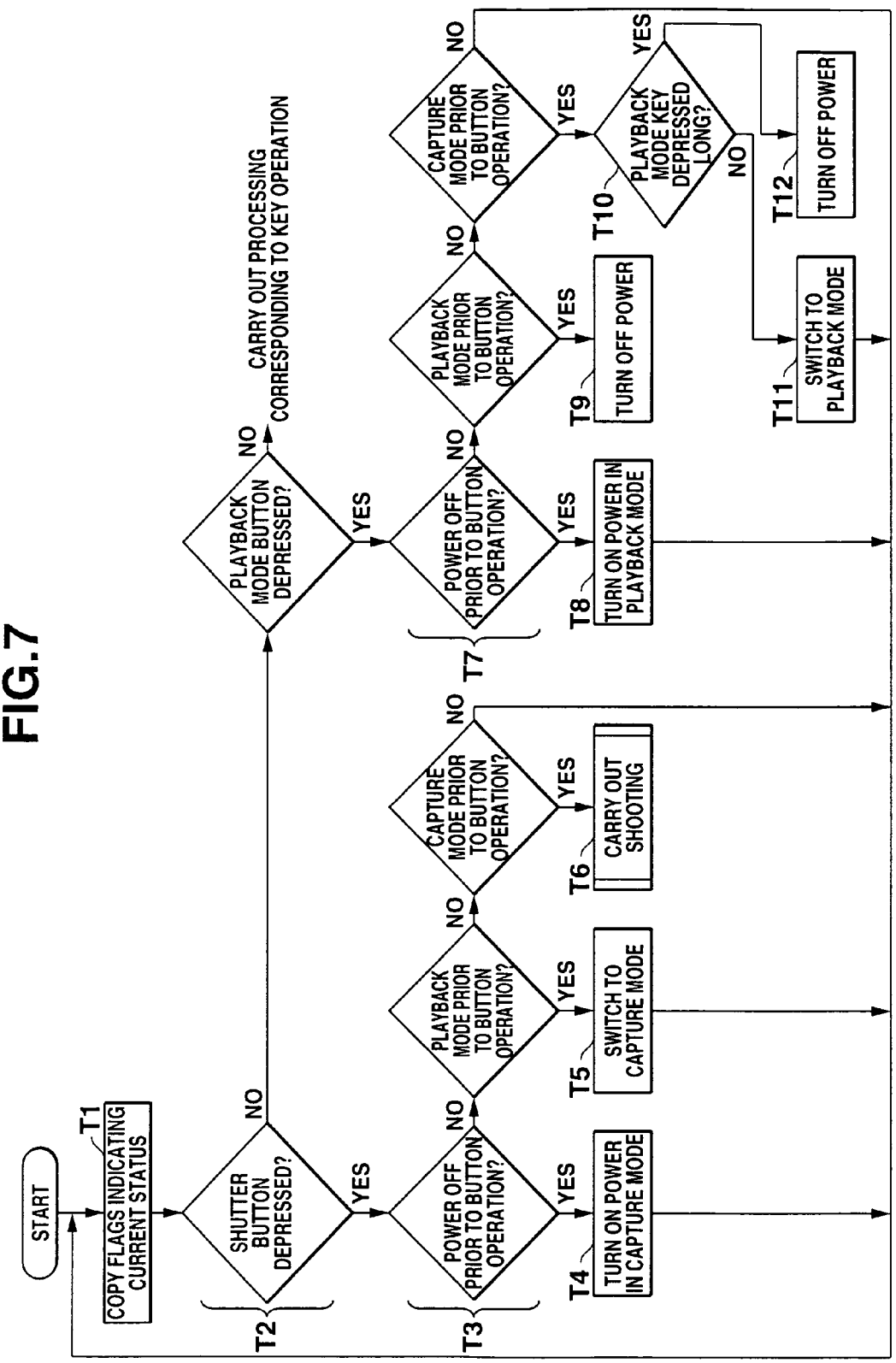
FIG. 7 is a flowchart illustrating an operation of the digital camera of FIGS. 5A and 5B.

FIG. 7 is a flowchart illustrating an operation of the digital camera of FIGS. 5A and 5B, which corresponds to the control procedure of the CPU in the controller 32 based upon a capture/playback mode switching program. This control procedure will be described below by reference to FIGS. 2, 5, and 6. Note that the digital camera 200 is supplied with an auxiliary power which is supplied to the subsidiary CPU to allow the control operation of the controller 32 even when the main power is off, and the operation program executed on operation of the mode switching buttons and so on resides in the RAM as in the case of the first embodiment.

The CPU started by an output from the subsidiary CPU copies the values of state flags indicating the current states of the processing modes and the main power into predetermined areas of the RAM (step T1).

The user first depresses the shutter button 2 or the playback mode button 5 to set the digital camera 200 to the capture enable state or the playback enable state. The subsidiary CPU then examines a signal sent from the key entry unit 36. When the shutter button 2 is depressed, the main CPU is started and the procedure goes to step T3. When the playback mode button 5 is depressed, the procedure goes to step T7. When another button is depressed, processing corresponding to the depressed button is carried out (step T2).

When the shutter button 2 is depressed, the CPU examines the state of the digital camera 200 prior to the depression of the shutter button 2. If the state prior to the button operation is the power-off state, then the procedure goes to step T4. In the case of the playback mode, the procedure goes to step T5. In the case of the capture mode, the procedure goes to step T6. The state of the digital camera 200 after the shutter button 2 is depressed differs from the state before it is depressed. The CPU can know the state of the digital camera 200 prior to the button depression by examining its state flags copied in the RAM (step T3).

When the state prior to the shutter button operation is the power-off state, the controller 32 sets the capture mode and turns on the power upon depression of the shutter button 2, thereby setting the digital camera 200 to the capture enable state (step T4). The procedure then returns to step T1 to wait for the next key operation by the user. When the state prior to the shutter operation is the playback mode, the processing mode is switched to the capture mode upon depression of the shutter button 2, thereby setting the digital camera 200 to the capture enable state (step T5). The procedure then returns to step T1 to wait for the next key operation by the user. When the state prior to the shutter depression is the capture mode, shooting is carried out upon depression of the shutter button 2 (step T6). The procedure then returns to step T1 to wait for the next key operation by the user.

When the playback mode button 5 is depressed, the CPU examines the state of the digital camera 200 prior to depression of the playback button 5 (step T7). If the state prior to the button operation is the power-off state, then the procedure goes to step T8. In the case of the playback mode, the procedure goes to step T9. In the case of the capture mode, the procedure goes to step T10.

When the state prior to the playback button operation is the power-off state, switching is made to the playback mode and the power is turned on upon depression of the playback mode button 5 (step T8), thereby setting the digital camera 200 to the playback enable state. The procedure then returns to step T1 to wait for the next key operation by the user (for example, an operation of selecting an image to be reviewed). If the playback button is depressed in the playback mode, then the power is turned off (step T9).

When the playback mode button 5 is depressed in the capture mode, the CPU examines whether or not it is being depressed for a long period of time (for more than a given period of time) (step T10). If it is depressed long, then the procedure goes to step T12 to turn off the power. If the playback mode button 5 is not depressed long, then the processing mode is switched to the playback mode to set the camera 200 to the playback enable state (step T11) and the procedure then returns to step T1 to wait for the next key operation of the user.

The digital camera 200 thus configured allows switching to be made immediately from the power-off state or playback mode to the capture mode; therefore, unlike the prior art, the time-consuming mode-switching operation can be avoided. The operation of the shutter button 2 allows the power to be turned on and hence shooting to be performed immediately even in a hurry. In addition, the camera 200 also allows switching to be made immediately from the power-off state or capture mode to the playback mode, thus requiring little time in mode switching unlike the prior art. Furthermore, even if there is no power switch and no capture mode button, merely operating the shutter button 2 or the playback mode button 5 allows the power to be turned on to thereby set the camera 200 to the capture or playback enable state; thus, the number of buttons can be further reduced.

Although step T4 is configured such that, when the state prior to the button operation is the power-off state, switching is made to the capture mode and the power is turned on to thereby set the digital camera 200 to the capture enable state, the step may be modified such that, when the state prior to the button operation is the power-off state, the power is first turned on and then the switching is made to the capture mode. Namely, in any case, the power is simply turned on in the capture mode.

In the similar manner, although step T8 is configured such that, when the state prior to the button operation is the power-off state, switching is made to the playback mode and the power is turned on to thereby set the digital camera to the playback enable state, the step may be modified such that, when the state prior to the button operation is the power-off state, the power is first turned on and switching is made to the playback mode. Namely, in any case, the power is simply turned on in the playback mode.

EMBODIMENT 3

The second embodiment described above is configured in such a way as to turn on the power and set the camera to the capture or playback enable state upon operation of the shutter button 2 or the playback mode button 5. The third embodiment is configured such that operating the power switch or mode switching button causes the camera 300 to enter the capture mode with the power turned on and operating the mode switching button allows mode switching.

That is, the digital camera 300 is switched to the capture mode and, at the same time, the power is turned on upon operation of the power switch or button 1, so that it is placed in the capture enable state. The mode switching button 14 is provided in place of the capture and playback mode buttons. By operating the mode switching button 14, the camera 300 is set to the capture or playback enable state.

FIGS. 8A and 8B are exterior views of the digital camera 300 of the third embodiment. FIG. 8A is a top view of the camera 300 and FIG. 8B is a rear view of the camera 300. FIG. 9 shows operation patterns of the digital camera 300 of the third embodiment when the mode switching button 14 and the power button 1 are operated.

As shown in FIG. 8A, the digital camera 300 is equipped on top with a power button 1, a shutter button 2, and a zoom lever 3.

The power button 1 is a key to turn the power on or off with each operation. As shown in FIG. 9, when operated in the power-off state, the power button 1 sets the processing mode to the capture mode and turns on the power. When operated in the playback or capture mode, the power button turns off the power.

The shutter button 2, when operated in the capture mode, instructs shutter release. In menu selection, the shutter button 2 also instructs setting/execution. The zoom lever 3 is used to perform zooming operations.

In addition, the digital camera 300 is equipped on rear with an optical finder window 6, an operation confirmation LED 7, a flash indicator LED 8, a menu key 9, a jog dial 10, a set key 11, a liquid crystal display 12, a DISP key 13, and the mode switching button 14 as shown in FIG. 8B.

The mode switching button 14 is a key to switch the modes with each operation. As shown in FIG. 9, when operated in the power-off state, the button 14 sets the processing mode to the capture mode and turns on the power to the camera 300. When operated in the playback mode, the button 14 switches the processing mode to the capture mode. When operated in the capture mode, the button 14 switches the processing mode to the playback mode.

The arrangement and functions of the operation confirmation LED 7 through DISP key 13 are the same as those of the digital camera 100 of the first embodiment shown in FIG. 1B. Though not shown, the front side of the digital camera 300 is also the same as that of the digital camera 100. The corresponding parts of the digital camera 300 to those of the digital camera 100 are denoted by the same or like reference numerals.

The electronic circuit arrangement of the digital camera 300 also remains unchanged from that of the digital camera 100 shown in FIG. 3 except the configurations of the controller 32 and the key entry unit 36 and part of the functions of the controller 32 associated with key operations.

The key entry unit 36 of the digital camera 300 is composed, as shown in FIGS. 8A and 8B, of the power button 1, the shutter button 2, the zoom lever 3, the menu key 9, the jog dial 10, the set key 11, the DISP key 13, and the mode switching key 14. The signals associated with the operations of these keys or buttons are directly sent to the controller 32.

When the power button 1 is operated in a state where the power to the camera 300 is off, the subsidiary CPU provided in the controller 32 detects the button operation and makes the main CPU set the processing mode to the capture mode and turns on the power as shown in FIG. 9, in the similar manner as the first or second embodiment. When the power button 1 is operated in the playback or capture mode, the controller 32 turns off the power. When the mode switching button 14 is depressed in the power-off state, the controller 32 switches the processing mode to the capture mode and turns on the power. When the mode switching button 14 is depressed in the playback mode, the controller 32 switches the processing mode to the capture mode. When the mode switching button 14 is depressed in the capture mode, the controller 32 switches the processing mode to the playback mode.

[Switching Operation]

Figure 10:
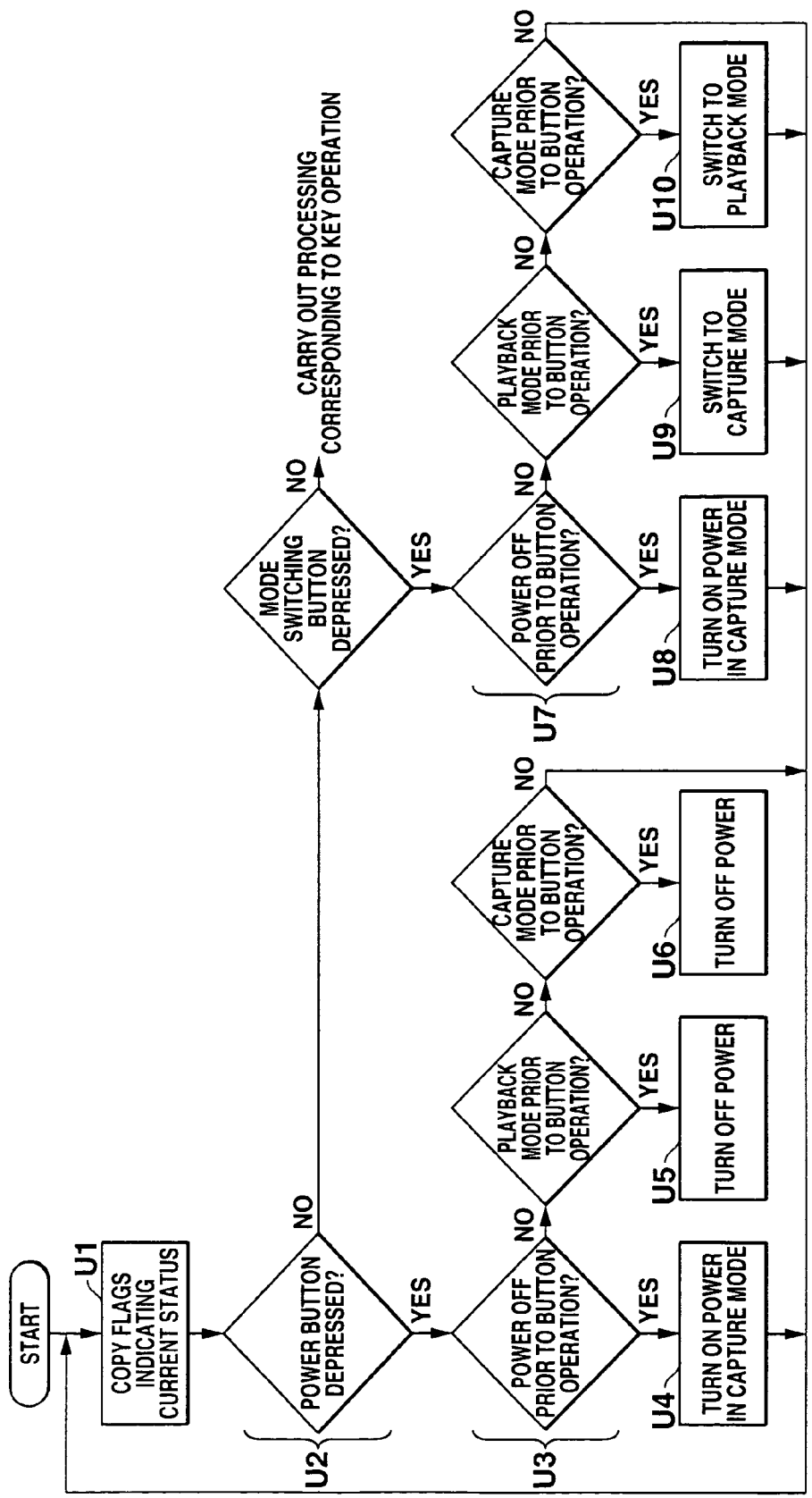
FIG. 10 is a flowchart illustrating an operation of the digital camera of FIGS. 8A and 8B.

FIG. 10 is a flowchart illustrating an operation of the digital camera 300 shown in FIGS. 8A and 8B, which corresponds to the control procedure of the main CPU in the controller 32 based upon a capture/playback mode switching program. This control procedure will be described below by reference to FIGS. 2, 8, and 9. Note that the digital camera 300 is supplied with auxiliary power to allow the control operation of the subsidiary CPU provided in the controller 32 even when the main power is off, and the operation program executed on operations of the power button 1 and the mode switching button 14 and resides in the RAM.

The main CPU copies the values of state flags indicating the current states of the processing modes and the main power into predetermined areas of the RAM (step U1).

The user first depresses the power button 1 or the mode switching button 14 to set the digital camera 300 to the capture enable state or the playback enable state. The CPU then examines a signal sent from the key entry unit 36. When the power button 1 is depressed, the procedure goes to step U3. When the mode switching button 14 is depressed, the procedure goes to step U7. When another button or key in the key entry unit 36 is depressed, processing corresponding to the depressed button or key is carried out (step U2).

When the power button 1 is depressed, the CPU examines the state of the digital camera 300 prior to the power switch depression. If the state prior to the power button operation is the power-off state, then the procedure goes to step U4. In the case of the playback mode, the procedure goes to step U5. In the case of the capture mode, the procedure goes to step U6. The state of the digital camera 300 after the power button 1 is depressed differs from the state before it is depressed. The CPU can know the state of the digital camera 300 prior to the depression of the power button 1 by examining the state flags copied in the RAM (step U3).

If the state prior to the power button operation is the power-off state, switching is made to the capture mode and the main power is turned on to thereby set the digital camera 300 to the capture enable state (step U4). The procedure then returns to step U1 to wait for the next key (button, switch) operation by the user. If the state prior to the power button operation is the playback mode, the power is turned off (step U5). If the state prior to the power button depression is the capture mode, the power is turned off (step U6).

When the mode switching button 14 is depressed, the CPU examines the state of the digital camera 300 prior to depression of the mode switching button (step U7). If the state prior to the button operation is the power-off state, then the procedure goes to step U8. In the case of the playback mode, the procedure goes to step U9. In the case of the capture mode, the procedure goes to step U10. The CPU can know the state of the digital camera 300 prior to the depression of the mode switching button 14 by examining the state flags copied in the RAM (step U7).

If the state prior to the operation of the mode switching button 14 is the power-off state, switching is made to the capture mode and the power is turned on (step U8), thereby setting the digital camera 300 to the capture enable state. The procedure then returns to step U1 to wait for the next key operation by the user (for example, an operation of depressing the shutter button 2 to issue a command to capture an image). If the state prior to the depression of the mode switching button 14 is the playback mode, then switching is made to the capture mode (step U9). The procedure then returns to step U1 to wait for the next key operation by the user.

If the state prior to the depression of the mode switching button 14 is the capture mode, then the CPU switches the processing mode to the playback mode (step U10) and then returns to step U1 to wait for the next key operation by the user.

With the digital camera 300 thus configured, operating the power button 1 or the mode switching button 14 in the power-off state allows switching to be made to the capture mode and the power to be turned on without fail. Furthermore, operating the mode switching button 14 allows immediate switching from the playback mode to the capture mode or vice versa. Therefore, unlike the prior art, the time-consuming mode-switching operation can be avoided. The operation of the power button 1 or the mode switching button 14 allows the power to be turned on to set the digital camera to the capture enable state; therefore, the user is allowed to perform shooting immediately even in a hurry.

The mode switching button 14 may be configured to emit color light corresponding to the mode after switching. In this case, for example, step U8 may be changed so as to switch the processing mode to the capture mode, turn on the power and cause the mode switching button 14 to emit red light. Step U9 may be changed so as to switch the processing mode to the capture mode and cause the mode switching button 14 to emit red light. Step U10 may be changed so as to switch the processing mode to the playback mode and cause the mode switching button 14 to emit green light. After these steps, return is made to step U1 to wait for the next key operation by the user.

Although step U4 is configured such that, when the state prior to the power switch operation is the power-off state, switching is made to the capture mode and the power is turned on to thereby set the digital camera 300 to the capture enable state, the step may be modified such that, when the state prior to the button operation is the power-off state, the power is turned on and switching is made to the capture mode. Namely, in any case, it is only required that the power be turned on in the capture mode.

Although step U8 is configured such that, when the state prior to the mode switching button operation is the power-off state, switching is made to the playback mode and the power is turned on to thereby set the digital camera 300 to the playback enable state, the step may be modified such that, when the state prior to the mode switching button operation is the power-off state, the power is turned on and switching is made to the playback mode. Namely, in any case, the power is simply turned on in the playback mode.

Although the embodiments of the present invention have been disclosed, it is apparent that other embodiments and modifications are possible. Although the embodiments have been described in terms of digital cameras, the present invention is not limited to electronic cameras such as digital cameras and can be adapted to image capture devices in general.

What is claimed is:

1. An image capture device comprising:
a capture mode key and a playback mode key which are operable by a user;
a detecting unit configured to detect operation states of the capture mode key and the playback mode key;
a first switching operation control unit configured to, if a power to the image capture device is in an off state when the operation of either of the mode keys is detected, turn on the power to the image capture device in a mode corresponding to an operated one of either of the mode keys;
a second switching operation control unit configured to, if, when the operation of either of the mode keys is detected, the mode of the image capture device differs from the mode corresponding to the operated key, switch the mode of the image capture device to the mode corresponding to the operated key; and
a third switching operation control unit configured to, if, when the operation of either of the mode keys is detected, the mode of the image capture device is identical to the mode corresponding to the operated key, turn off the power to the image capture device.

2. An image capture device comprising:
a shutter key and a playback mode key which are operable by a user;
a detecting unit configured to detect an operated state of the playback mode key;
a first switching operation control unit configured to, when the shutter key is operated, turn on power to the image capture device in a capture mode; and
a second switching operation control unit configured to, when the operation of the playback mode key is detected by the detecting unit, if a mode of the image capture device differs from a playback mode, switch the mode of the image capture device to the playback mode and, if the mode of the image capture device is the playback mode, turn off the power to the image capture device.

3. An image capture device comprising:
a capture mode key and a playback mode key which are operable by a user;
a detecting unit configured to detect operations of the capture mode key and the playback mode key;
a first switching operation control unit configured to, when the operation of the capture mode key is detected by the detecting unit, turn power to the image capture device on in a capture mode if the image capture device is in a power-off state, switch the mode of the image capture device to the capture mode if the image capture device is in a playback mode, and turn off the power if the image capture device is in the capture mode; and
a second switching operation control unit configured to, when the operation of the playback mode key is detected by the detecting unit, turn on the power to the image capture device in the playback mode if the image capture device is in the power-off state, switch the mode of the image capture device to the playback mode if the image capture device is in the capture mode, and turn off the power if the image capture device is in the playback mode.

4. An image capture device comprising:
a shutter key and a playback mode key which are operable by a user;
a first switching operation control unit configured to, when the shutter key is operated, detect a state of power and a processing mode of the image capture device prior to the shutter key operation, turn on the power to the image capture device in a capture mode if the image capture device is in a power-off state at a time of the shutter key operation, switch the mode of the image capture device to the capture mode if the image capture device is in a playback mode at the time of the shutter key operation, and give a command to capture an image if the image capture device is in the capture mode at the time of the shutter key operation; and
a second switching operation control unit configured to, when the playback mode key is operated, detect the state of the power and the processing mode of the image capture device at the time of the playback mode key operation, turn on the power to the image capture device in the playback mode if the image capture device is in the power-off state at the time of the playback mode key operation, switch the mode of the image capture device to the playback mode if the image capture device is in the capture mode at the time of the playback mode key operation, turn off the power if the image capture device is in the playback mode at the time of the playback mode key operation, and turn the power to the image capture device off if the image capture device is in the capture mode at the time of the playback mode key operation and the playback mode key is kept in a given state for more than a predetermined period of time.

5. A computer-readable medium having stored thereon a computer program for an image capture device, wherein the computer program controls the image capture device to perform functions comprising:
detecting operation of a capture mode key;
detecting a state of power and a processing mode of the image capture device when the operation of the capture mode key is detected;
turning on the power to the image capture device in a capture mode if the power is in an off state when the operation of the capture mode key is detected;
switching the processing mode of the image capture device to the capture mode if the image capture device is in a playback mode when the operation of the capture mode key is detected;
turning off the power to the image capture device if the image capture device is in the capture mode when the operation of the capture mode key is detected;
detecting operation of a playback mode key;
detecting the state of the power and the processing mode of the image capture device when the operation of the playback mode key is detected;
turning on the power to the image capture device in the playback mode if the power is in the off state when the operation of the playback mode key is detected;
turning off the power to the image capture device if the image capture device is in the playback mode when the operation of the playback mode key is detected; and
switching the processing mode of the image capture device to the playback mode if the image capture device is in the capture mode when the operation of the playback mode key is detected.

6. A computer-readable medium having stored thereon a computer program for an image capture device, wherein the computer program controls the image capture device to perform functions comprising:
detecting operation of a shutter key;

detecting a state of power and a processing mode of the image capture device when the operation of the shutter key is detected;

turning on the power to the image capture device in a capture mode if the power is in an off state when the operation of the shutter key is detected;

switching the processing mode of the image capture device to the capture mode if the image capture device is in a playback mode when the operation of the shutter key is detected;

giving a command to capture an image if the image capture device is in the capture mode when the operation of the shutter key is detected;

detecting operation of a playback mode key;

detecting the state of the power and the processing mode of the image capture device when the operation of the playback mode key is detected;

turning on the power to the image capture device in the playback mode if the power is in the off state when the operation of the playback mode key is detected;

turning off the power to the image capture device if the image capture device is in the playback mode when the operation of the playback mode key is detected;

switching the processing mode of the image capture device to the playback mode if the image capture device is in the capture mode when the operation of the playback mode key is detected; and turning off the power to the image capture device if the playback mode key is kept in a given state after the operation of the playback mode key and if the image capture device is in the capture mode when the operation of the playback mode key is detected.

7. An electronic device having a first mode in which a first operation is performed and a second mode in which a second operation is performed, comprising:

a first-mode designation key and a second-mode designation key which are operable by a user;

a detecting unit configured to detect operated states of the first-mode designation key and the second-mode designation key;

a first switching operation control unit configured to, if power to the electronic device is in an off state when the operation of either of the mode designation keys is detected, turn on the power to the electronic device in a mode designated by the operated key;

a second switching operation control unit configured to, if, when the operation of either of the mode designation keys is detected, the mode of the electronic device differs from the mode corresponding to the operated key, switch the mode of the electronic device to the mode designated by the operated key; and a third switching operation control unit configured to, if, when the operation of either of the mode designation keys is detected, the mode of the electronic device is identical to the mode designated by the operated key, turn off the power to the electronic device.

* * * * *